United States Patent [19]

Young et al.

[11] Patent Number: 4,990,922
[45] Date of Patent: Feb. 5, 1991

[54] SYSTEM AND METHOD FOR MEASURING OCEAN SURFACE CURRENTS AT LOCATIONS REMOTE FROM LAND MASSES USING SYNTHETIC APERTURE RADAR

[75] Inventors: Lawrence E. Young, La Canada; Jeffrey M. Srinivasan; Thomas K. Meehan, both of Glendale; Timothy N. Munson, La Crescenta; George H. Purcell, Jr., Pasadena; Jess B. Thomas; Courtney B. Duncan, both of La Canada, all of Calif.

[73] Assignee: The United States of America as represented by the Administrator, National Aeronautics and Space Administration, Washington, D.C.

[21] Appl. No.: 493,190

[22] Filed: Mar. 14, 1990

[51] Int. Cl.⁵ .................. G01S 13/86; G01S 13/89
[52] U.S. Cl. .......................... 342/52; 342/26; 342/357
[58] Field of Search ............ 392/52, 56, 191, 25, 392/26, 356, 357

[56] References Cited

U.S. PATENT DOCUMENTS 4,881,080 11/1989 Jablonski ........................... 342/357
4,922,254 5/1990 Schuessler et al. ................. 342/25

Primary Examiner—Gilberto Barron, Jr.
Attorney, Agent, or Firm—Thomas H. Jones; John R. Manning; Harold W. Adams

[57] ABSTRACT

This is a system for measuring ocean surface currents from an airborne platform. A radar system having two spaced antennas wherein one antenna is driven and return signals from the ocean surface are detected by both antennas is employed to get raw ocean current data which is saved for later processing. There are a pair of GPS systems including a first antenna carried by the platform at a first location and a second antenna carried by the platform at a second location displaced from the first antenna for determining the position of the antennas from signals from orbiting GPS navigational satellites. This data is also saved for later processing. The saved data is subsequently processed by a ground-based computer system to determine the position, orientation, and velocity of the platform as well as to derive measurements of currents on the ocean surface.

8 Claims, 2 Drawing Sheets

SYSTEM AND METHOD FOR MEASURING OCEAN SURFACE CURRENTS AT LOCATIONS REMOTE FROM LAND MASSES USING SYNTHETIC APERTURE RADAR

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to radar systems and their methods of operation for particular purposes and, more particularly, to a method of measuring ocean surface currents from an airborne platform without a fixed landmass against which to determine necessary data comprising the steps of, directing a first radar antenna carried by the platform at a first location toward an ocean surface of interest; directing a second radar antenna carried by the platform at a second location displaced from the first location toward the ocean surface; driving the first radar antenna with a radar signal; receiving return signals from the ocean surface from the first radar antenna and the second radar antenna and saving data contained in the return signals; employing a first satellite-based global position determination system including a first GPS antenna carried by the platform at a third location to determine the position of the first GPS antenna from signals from orbiting navigational satellites and saving data reflecting the position of the first GPS antenna; employing a second satellite-based global position determination system including a second GPS antenna carried by the platform at a fourth location displaced from the first GPS antenna to determine the position of the second GPS antenna from signals from the orbiting navigational satellites and saving data reflecting the position of the second GPS antenna; and, using the saved data to determine the position, orientation, and velocity of the platform along with measurements of currents on the ocean surface relative to the position, orientation, and velocity of the platform.

In a preferred embodiment, the steps of employing a first satellite-based global position determination system including a first GPS antenna carried by the platform at a third location to determine the position of the first GPS antenna from signals from orbiting navigational satellites and saving data reflecting the position of the first GPS antenna and employing a second satellite-based global position determination system including a second GPS antenna carried by the platform at a fourth location displaced from the first GPS antenna to determine the position of the second GPS antenna from signals from the orbiting navigational satellites and saving data reflecting the position of the second GPS antenna each includes the steps of, searching systematically for signals from the orbiting navigational satellites over all possible values of range and range rate until a signal of interest is found and locked onto; and, locking onto a found signal of interest.

Where the two spaced radar antennas are disposed on a first baseline of the platform and the first GPS antenna and the second GPS antenna are disposed on a second baseline of the platform which is not parallel to the first baseline, the method additionally comprises the step of employing a third satellite-based global position determination system including a third GPS antenna carried by the platform at a fifth location displaced from the first GPS antenna and the second GPS antenna to determine the position of the third GPS antenna from signals from the orbiting navigational satellites and saving data reflecting the position of the third GPS antenna.

BACKGROUND ART

Workers at the Jet Propulsion Laboratory in Pasadena, Ca. have developed a method for measuring ocean surface currents employing a synthetic aperture radar (SAR) of a type well known to those skilled in the art. In the interest of simplicity and the avoidance of redundancy, the operation of SAR will not be discussed herein as it is of no relevance to the present invention. As depicted in FIG. 1, the method involves differencing images of surface waves formed by two antennas 10, 10' on an aircraft 12. Their approach uses a conventional SAR system with the two antennas 10, 10' mounted fore and aft along the fuselage of the aircraft 12. One antenna 10 transmits and the signals received at both antennas 10, 10' are first processed separately into two images by the SAR 14. The data of the two images are stored in the memory 16 and then combined interferometrically at a later time by appropriate logic at a ground site.

A fundamental problem with this method is that it assumes the motion of the aircraft 12 to be parallel to the radar baseline (i.e. the vector separation of the antennas 10, 10'). If the aircraft 12 drifts sideways, the radar will interpret the motion as a radial velocity of the water below. For example, in one system which was investigated, an error of 0.01 degree in the azimuth of the SAR baseline will induce an error of 4 cm/s in the velocity of the current along the line of sight. Until now, this problem has been dealt with by taking care to include a stationary area (i.e. land) in the radar images and using this filed region to calibrate both the velocity and orientation of the aircraft 12. Obviously, the need for this calibration limits the application of the technique to areas near land.

STATEMENT OF THE INVENTION

Accordingly, in order to extend the above-described prior art method to mid-oceanic regions, it is the object of this invention to provide an alternate means of calibrating the location, velocity, and orientation of the SAR radar.

Other objects and benefits of the invention will become apparent from the detailed description which follows hereinafter when taken in conjunction with the drawing figures which accompany it.

DETAILED DESCRIPTION OF THE INVENTION

In a problem analogous to the present one, navigation of ships and aircraft was long accomplished by celestial navigation techniques where the navigator would take a "fix" on known celestial bodies and then determine the position of the vessel as a function of the intersection of the sighting lines. Where one is close to a land body having radio transmitting apparatus for the purpose, systems such as LORAN can be employed; however, in the open ocean such systems are unavailable. Until quite recently, therefore, one had to rely on the old methods of celestial navigation. The introduction of satellite navigation systems has changed that to a great degree, however. Where one can afford the equipment, systems such as the Global Positioning System (GPS) can electronically and automatically provide one's position on the surface of the Earth with great precision. To provide these systems, a plurality of satellites were placed in precise Earth orbit. At any particular instant, one can get an electronic lock on several of the satellites and the information derived from the signals therefrom can be used to precisely calculate one's position. Of course, the calculations are all performed by a digital computer and all one has to do is read out positional information. The present invention employs GPS to obtain its objectives.

Figure 2:
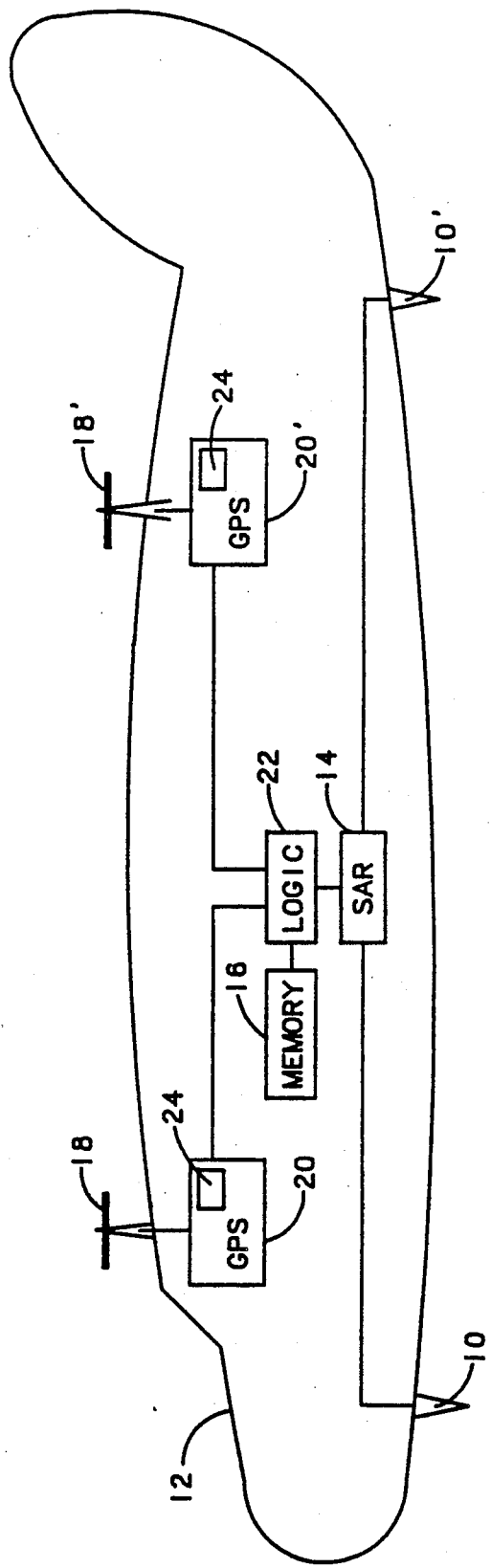
FIG. 2 is a simplified drawing of a system for measuring surface ocean currents according to the present invention in a first embodiment.
Figure 3:
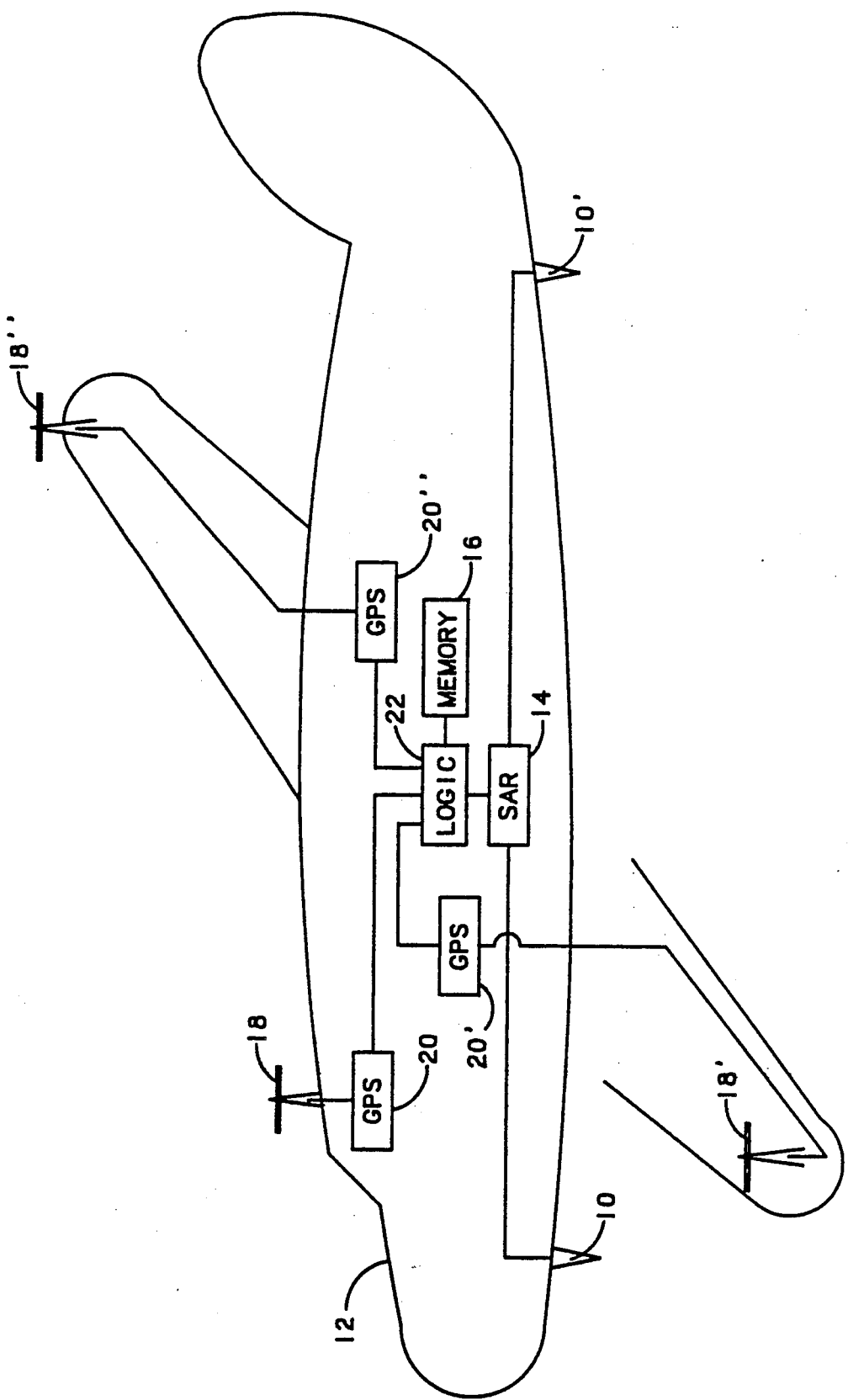
FIG. 3 is a simplified drawing of a system for measuring surface ocean currents according to the present invention in a second embodiment.

One system for practicing the method of the present invention is depicted in FIG. 2. In addition to the SAR antennas 10, 10', the aircraft 12 is provided with two GPS antennas 18, 18' mounted fore and aft on the fuselage. In a tested embodiment, the antennas 18, 18' were crossed-dipoles, but this is not a critical limitation. Typically for normal GPS position determination only one antenna is employed. For the unique purposes herein, however, two antennas are employed. This, of course, assumes that the baselines along which the SAR antennas 10, 10' and the GPS antennas 18, 18' are located are parallel. If they are not parallel, then three GPS antennas 18, 18' and 18" as depicted in FIG. 3 (with associated provision for processing the information from the third antenna 18") should be provided. In the situation where the baselines along which the SAR antennas 10, 10' and the GPS antennas 18, 18' are located are parallel as assumed in FIG. 2 (which depicts the test platform employed to test the present invention), one antenna 18 was positioned in the median plane of the aircraft 12 about 2 meters behind and above the cockpit windows. The other antenna 18' was positioned 23 meters farther back and to the left of the median plane, about 27 degrees from the top of the fuselage. In this tested embodiment, the results of which are being reported herein, the aircraft was a DC-8 and the shell of each antenna 18, 18' was a spherical cap 12 cm wide at the base and protruding 4 cm from the skin of the aircraft. Thus, as can be appreciated, the drawing of FIG. 2 is not to scale; but rather, the antennas 18, 18' are enlarged so that they can be seen easily in the drawing. Also, it is again worthy of note that this is a representative tested example only and the sizing, spacing, etc. of the equipment is by way of example only and not meant to be limiting. What should be appreciated is that given the accuracy of the GPS equipment (not guaranteed but, in fact, good to only a few meters of inaccuracy), the spacing between the antennas 18, 18' on the platform of the aircraft 12 is substantial such that the positions of the two antennas 18, 18' are separately determinable by the GPS equipment connected thereto. In general, the antennas 18, 18' should be spaced as far apart as practical on the aircraft.

Figure 1:
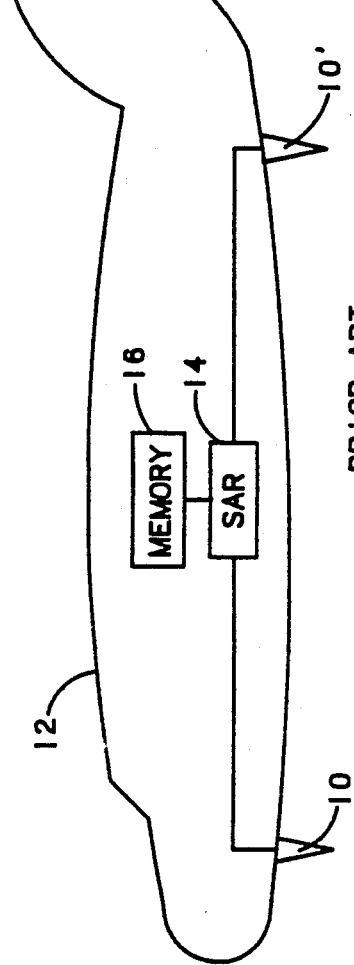
FIG. 1 is a simplified drawing of a prior art system for measuring surface ocean currents.

In this regard, each antenna 18, 18' is connected to a separate Rogue GPS receiver 20, 20'. The embodiment of FIG. 3 would have each antenna 18, 18', 18" connected to a separate Rogue GPS receiver 20, 20', 20". As those skilled in the art will undoubtedly recognize and appreciate, one could use one GPS receiver to derive the necessary data from the antennas 18, 18' or 18, 18', 18" by appropriate switching techniques such as are well known in the art. The GPS receivers 20, 20' and the SAR 14 are all connected to logic 22 which gathers the data from the GPS receivers 20, 20' (and 20" if included as in FIG. 3) and the SAR 14 and stores it in the memory 16 connected thereto for subsequent processing by ground-based computational equipment as mentioned earlier for the prior art system of FIG. 1. Additionally it should be noted that in the tested embodiment being reported herein, the two GPS receivers 20, 20' shared a rubidium frequency standard so that any error caused by the frequency standard would be a common error and the positional offset between the antennas 20, 20' would not be affected thereby. Where separate GPS receivers are used, the use of a separate frequency standard is preferred as operation with separate frequency standards in each of multiple GPS receivers is virtually impossible.

At the time of the tests conducted to prove the operability of the present invention, the two Rogue GPS receivers 20, 20' were configured to acquire and track four satellites simultaneously, computing time-tagged P1 and P2 pseudo-range and L1 and L2 carrier phase along with signal-to-noise ratios, and outputting the values to the logic 22 for storage in the memory 16 once per second. In this regard, it should be pointed out that the acquisition logic 24 contained within the two Rogue GPS receivers 20, 20' was originally implemented with algorithms that worked for a relatively stationary receiver (such as a boat) and required that the user know approximately where he was (within a few km) and what time it was (within a few microseconds), as well as the range and range rate of the satellites. To actually acquire the satellites, the user had to have an ephemeris for each one (prepared ahead of time) giving predicted range and range rate as a function of time for the known location of the receiver. The user would then enter the appropriate range and rate into the receiver, and the receiver would then "lock on" to the GPS signal. Obviously, such a scheme would not work within the environment of the present invention. Thus, the acquisition logic 24 contained within the two Rogue GPS receivers 20, 20' was modified to search systematically for the signals from the satellites over all possible values of range and range rate until the signal of interest was found and locked onto. This approach still required a moderately good knowledge of the time; but, was able to find and lock onto the satellites from the moving platform of the aircraft so as to provide the necessary data on GPS antenna position.

Basically, therefore, the method of the present invention is to employ the GPS receiver(s) to continuously determine the positions of the spaced GPS antennas, from which the position, velocity, and orientation of the aircraft can be determined so as to eliminate the necessity of having a fixed land mass in the field of vision to provide necessary data. It further includes finding and locking onto GPS satellites by a search technique.

The results of applicants' testing of the embodiment and aerial testbed referred to above are described in detail in a paper presented at the 5th International Symposium on Satellite Positioning which took place on Mar. 17, 1989.

As stated above, the method of the present invention employs the GPS receivers to continuously determine the positions of the spaced GPS antennas from which the position, velocity, and orientation of the aircraft can be determined using the broadcast ephemerides and a straightforward analysis according to techniques well known to those skilled in the art for such applications. In the testing, some of the GPS data were reduced to determine the orientation (i.e. azimuth and pitch) of the aircraft, as well as its position and velocity, at one-second intervals. In this manner, the position and velocity of the aircraft were determined with uncertainties of about 15 m and 0.015 m/s, respectively. With improved GPS satellite orbits and more precise analysis, it is expected that these uncertainties could be reduced to 0.1 m in position and 0.002 m/s or better in velocity.

Multipath dominates the error budget for the orientation measurements. With the simplest analysis, the uncertainty of a one-second, single-frequency (L1) measurement of azimuth is typically about 0.012 degrees and the uncertainty of a typical pitch measurement is about 0.038 degrees. Straightforward refinements of the analysis can certainly reduce these uncertainties by 40% or more, and improvements in observing techniques (e.g. as in the placement of the antennas with respect to possible interference by wings and other elements of the aircraft) should reduce them still further. The results of the tests conducted with the present invention clearly indicate that the addition of GPS measurements to the SAR database will make it possible to extend SAR maps of ocean currents to remote offshore regions.

Wherefore, having thus described the invention, what is claimed is:

1. In a system for measuring ocean surface currents from an airborne platform using a radar system having two spaced radar antennas wherein one radar antenna is driven with a radar signal and return signals from an ocean surface are detected by both radar antennas and radar data from signals from the radar antennas is used by computational logic to derive measurements of currents on the ocean surface, the improvement with which to determine the position, orientation, and velocity of the platform for use by the computational logic comprising:
   (a) first satellite-based global position determination system means including a first GPS antenna carried by the platform at a first location for determining the position of said first antenna from signals from orbiting navigational satellites and for outputting a first signal containing GPS data reflecting said position of said first antenna;
   (b) second satellite-based global position determination system means including a second GPS antenna carried by the platform at a second location displaced from said first antenna for determining the position of said second antenna from signals from said orbiting navigational satellites and for outputting a second signal containing GPS data reflecting said position of said second antenna; and,
   (c) the computational logic including logic for determining from said GPS data contained in said first signal and said second signal the position, orientation, and velocity of the platform, wherein said first satellite-based global position determination system means and said second satellite-based global position determination system means comprise separate GPS receivers which share a common frequency standard.

2. The improvement to a system for measuring ocean surface currents of claim 1 wherein:
   (a) the two spaced radar antennas are disposed on a first baseline of the platform; and,
   (b) said first GPS antenna and said second GPS antenna are disposed on a second baseline of the platform which is parallel to said first baseline.

3. The improvement to a system for measuring ocean surface currents of claim 1 wherein:
   (a) the two spaced radar antennas are disposed on a first baseline of the platform; and,
   (b) said first GPS antenna and said second GPS antenna are disposed on a second baseline of the platform which is not parallel to said first baseline; and additionally comprising,
   (c) third satellite-based global position determination system means including a third GPS antenna carried by the platform at a third location displaced from said first antenna and said second antenna for determining the position of said third antenna from signals from said orbiting navigational satellites and for outputting a third signal containing GPS data reflecting said position of said third antenna; wherein,
   (d) the computational logic includes logic for determining from said GPS data contained in said first signal, said second signal, and said third signal the position, orientation, and velocity of the platform.

4. A system for measuring ocean surface currents from an airborne platform comprising:
   (a) a radar system carried by the platform having two spaced radar antennas wherein one radar antenna is driven with a radar signal and return signals from an ocean surface are detected by both radar antennas to output data reflecting said return signals; (b) first satellite-based global position determination system means including a first GPS antenna carried by the platform at a first location for determining the position of said first antenna from signals from orbiting navigational satellites and for outputting a first signal containing GPS data reflecting said position of said first antenna;
   (c) second satellite-based global position determination system means including a second GPS antenna carried by the platform at a second location displaced from said first antenna for determining the position of said second antenna from signals from said orbiting navigational satellites and for outputting a second signal containing GPS data reflecting said position of said second antenna; and,
   (d) computational logic for determining from said GPS data contained in said first signal and said second signal the position, orientation, and velocity of the platform and for employing said data reflecting said return signals relative to said position, orientation, and velocity of the platform to derive measurements of currents on said ocean surface, wherein said first satellite-based global position determination system means and said second satellite-based global position determination system means comprise separate GPS receivers which share a common frequency standard.

5. The system for measuring ocean surface currents of claim 4 wherein:
   (a) said two spaced radar antennas are disposed on a first baseline of the platform; and,
   (b) said first GPS antenna and said second GPS antenna are disposed on a second baseline of the platform which is parallel to said first baseline.

6. The improvement to a system for measuring ocean surface currents of claim 4 wherein:
   (a) said two spaced radar antennas are disposed on a first baseline of the platform; and,
   (b) said first GPS antenna and said second GPS antenna are disposed on a second baseline of the platform which is not parallel to said first baseline; and additionally comprising,
   (c) third satellite-based global position determination system means including a third GPS antenna carried by the platform at a third location displaced from said first antenna and said second antenna for determining the position of said third antenna from signals from said orbiting navigational satellites and for outputting a third signal containing GPS data reflecting said position of said third antenna; wherein,
   (d) said computational logic includes logic for determining from said GPS data contained in said first signal, said second signal, and said third signal said position, orientation, and velocity of the platform.

7. The method of measuring ocean surface currents from an airborne platform without a fixed landmass against which to determine necessary data comprising the steps of:
   (a) directing a first radar antenna carried by the platform at a first location toward an ocean surface of interest;
   (b) directing a second radar antenna carried by the platform at a second location displaced from the first location toward the ocean surface;
   (c) driving the first radar antenna with a radar signal;
   (d) receiving return signals from the ocean surface from the first radar antenna and the second radar antenna and saving data contained in the return signals;
   (e) employing a first satellite-based global position determination system including a first GPS antenna carried by the platform at a third location to determine the position of the first GPS antenna from signals from orbiting navigational satellites and saving data reflecting the position of the first GPS antenna;
   (f) employing a second satellite-based global position determination system including a second GPS antenna carried by the platform at a fourth location displaced from the first GPS antenna to determine the position of the second GPS antenna from signals from the orbiting navigational satellites and saving data reflecting the position of the second GPS antenna; and
   (g) using the saved data to determine the position, orientation, and velocity of the platform along with measurements of currents on the ocean surface relative to the position, orientation, and velocity of the platform, wherein said steps of employing a first satellite-based global position determination system including a first GPS antenna carried by the platform at a third location to determine the position of the first GPS antenna from signals from orbiting navigational satellites and saving data reflecting the position of the first GPS antenna and employing a second satellite-based global position determination system including a second GPS antenna carried by the platform at a fourth location displaced from the first GPS antenna to determine the position of the second GPS antenna from signals from the orbiting navigational satellites and saving data reflecting the position of the second GPS antenna each include the steps of:
   (a) searching systematically for signals from the orbiting navigational satellites over all possible values of range and range rate until a signal of interest is found and locked onto; and,
   (b) locking onto a found signal of interest.

8. The method of claim 7 wherein the two spaced radar antennas are disposed on a first baseline of the platform and the first GPS antenna and the second GPS antenna are disposed on a second baseline of the platform which is not parallel to the first baseline and additionally comprising the step of:
   employing a third satellite-based global position determination system including a third GPS antenna carried by the platform at a fifth location displaced from the first GPS antenna and the second GPS antenna to determine the position of the third GPS antenna from signals from the orbiting navigational satellites and saving data reflecting the position of the third GPS antenna.

* * * * *